United States Patent
Stickle

(12) 
(10) Patent No.: US 10,873,601 B1
(45) Date of Patent: Dec. 22, 2020

(54) DECOY NETWORK-BASED SERVICE FOR DECEIVING ATTACKERS

(71) Applicant: Amazon Technologies, Inc., Seattle, WA (US)

(72) Inventor: Thomas C. Stickle, Saint James, NY (US)

(73) Assignee: Amazon Technologies, Inc., Seattle, WA (US)

( * ) Notice: Subject to any disclaimer, the term of this patent is extended or adjusted under 35 U.S.C. 154(b) by 186 days.

(21) Appl. No.: 16/115,318

(22) Filed: Aug. 28, 2018

(51) Int. Cl.
  *H04L 29/06* (2006.01)
  *G06F 9/54* (2006.01)

(52) U.S. Cl.
  CPC .......... *H04L 63/1491* (2013.01); *G06F 9/54* (2013.01); *H04L 63/1416* (2013.01)

(58) Field of Classification Search
  CPC .... H04L 63/1491; H04L 63/1416; G06F 9/54
  USPC .......................................................... 726/23
  See application file for complete search history.

(56) References Cited

U.S. PATENT DOCUMENTS 10,079,855 B2 * 9/2018 Versteeg ............... H04L 63/10
10,587,580 B2 * 3/2020 Subbarayan ........... G06N 20/00

\* cited by examiner

*Primary Examiner* — Longbit Chai
(74) *Attorney, Agent, or Firm* — Lee & Hayes, P.C.

(57) ABSTRACT

A decoy network-based service uses a decoy credential to lure an attacker to access the decoy network-based service, and monitors the attacker's activity with respect to the decoy network-based service to determine the attacker's motivation. In various examples, a decoy credential is published on an Internet-accessible site, and a system that provides a network-based service (e.g., a service provider network) subsequently receives an access request from a computing device that includes the decoy credential. Based on the decoy credential, the computing device may be provided access to a decoy network-based service, and application programming interface (API) calls made by the computing device may be routed through a decoy control plane. The data relating to the API calls may be stored and analyzed to determine a motivation of the attacker, which may be used in various downstream applications to improve security for customers of the network-based service.

18 Claims, 9 Drawing Sheets

US 10,873,601 B1

DECOY NETWORK-BASED SERVICE FOR DECEIVING ATTACKERS

BACKGROUND

Network-based services provide customers with access to computing resources and data, often on a permanent or an as-needed basis. Such computing resources (sometimes referred to herein as "resources") can include data storage resources, data processing resources (e.g., virtual machine (VM) instances), networking resources, data communication resources, and other types of resources. Although existing security measures, such as Identity and Access Management (IAM), provide some protection to customers, sometimes attackers are able to circumvent these base-level security measures by illicitly obtaining a customer's credentials, and using those credentials to access data and resources of a network-based service.

For instance, an attacker may compromise a host that uses credentials to interact with computing resources and data of a network-based service, and the attacker may exfiltrate those credentials from the host. Once the credentials are exfiltrated, the attacker, to avoid attribution, may call application programming interfaces (APIs) through an anonymizing proxy to determine the access that the credentials provide. The attacker's next move may depend on his/her motivation. An attacker who is motivated to exfiltrate sensitive data from a customer may invoke a toolkit that can compromise a host resource authorized to access the sensitive data. An attacker who is motivated to extort money or property may try to lock the customer out of his/her account, and may hold the customer's account for ransom. An attacker who is motivated to commit fraud may access an unused region of a customer's account and use the resources in the unused region for illicit purposes, such as for mining bitcoin.

Service providers of network-based services that are subjected to targeted attacks, like those described above, frequently lack a coherent understanding of the motivations of the attackers who target their customers. As a result, the service providers' customers are not adequately protected from such attacks. The disclosure made herein is presented with respect to these and other considerations.

DETAILED DESCRIPTION

Figure 1:
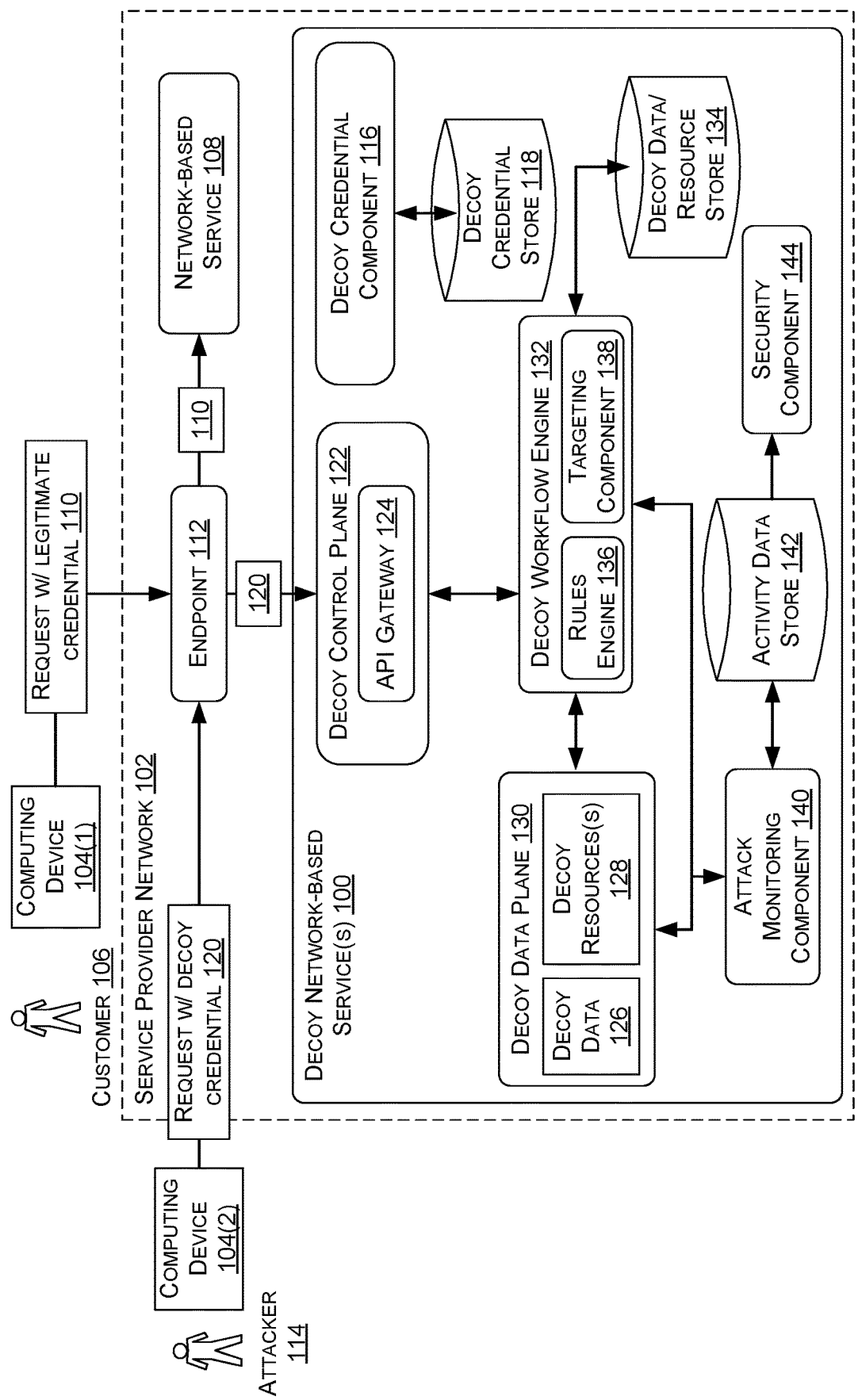
FIG. 1 is a software and network architecture diagram showing aspects of the operation of a service provider network that includes a decoy network-based service, according to some configurations.

Described herein are, among other things, techniques, devices, and systems for luring attackers to access a decoy network-based service, and, once an attacker is lured to the decoy network-based service, monitoring the attacker's activity to determine a motivation of the attacker. In various examples, a decoy credential(s) is published on an Internet-accessible site(s). Attackers who obtain the published decoy credential(s)—in attempting to discover the access that the decoy credential(s) provides—may be lured to a decoy network-based service. The decoy network-based service mimics a legitimate network-based service. Thus, to the attacker, the decoy network-based service appears to be a legitimate network-based service, even though it is not. Once the attacker is lured to the decoy network-based service, the attacker's computing device is provided access to the decoy network-based service based on the decoy credential. Thereafter, the attacker may utilize a toolkit(s) that issues API calls in an attempt to gain unauthorized access to data and/or resources. These API calls made by the attacker's computing device are routed through a decoy control plane, stored, and analyzed to determine a motivation of the attacker. In some embodiments, the decoy network-based service may be configured to iteratively return decoy data and/or decoy resources in response to the API calls made by the attacker's computing device. The decoy data and/or decoy resources may be returned in a decoy data plane to mimic legitimate data and/or resources of a legitimate network-based service so that the attacker is lured into advancing his/her attack, which allows for collecting additional data and for making additional observations about the attacker's activity. Data relating to the attacker's activity may be used in various downstream security-related applications to improve security for customers of the network-based service.

In an example process, a decoy credential may be provided on a site (e.g., published on an Internet-accessible site). Subsequently, a system that provides a network-based service (e.g., a service provider network) may receive a request from a computing device, the request including the decoy credential. The computing device that sent the request may be provided access to a decoy network-based service based at least in part on the decoy credential. Thereafter, API calls made by the computing device may be routed through a decoy control plane, and data relating to the API calls may be analyzed to determine a motivation of an entity (e.g., an attacker) associated with the computing device.

Implementations of the techniques and systems described herein can improve existing technologies (e.g., data security technologies). In particular, the techniques and systems described herein allow for understanding the motivations of attackers who target customers of a network-based service(s). Understanding the motivations of attackers can yield improvements in detection systems that are used to detect unauthorized access to data and/or resources of a network-based service(s). For instance, data obtained by monitoring attackers who are lured to the decoy network-based service can be used to train machine learning models configured to detect unauthorized access to a network-based service(s), allowing these detection systems to operate with improved detection accuracy. Attack patterns and trends can also be identified so that customers can be alerted to those attack patterns and trends. Security suggestions can also be provided to customers based on monitored activity of attackers in an attempt to improve the protection of the customers' data and/or resources. In addition to these benefits, the security of customer data and/or resources is inherently improved by the techniques and systems described herein; namely, by diverting attackers from real targets to decoy targets of a decoy network-based service. That is, the attacker's time is spent targeting decoy resources and decoy data, rather than real, sensitive data and/or resources associated with a customer. Furthermore, by luring an attacker and instantiating decoy resources and/or decoy data via a decoy data plane, the attacker is pulled away from, and no longer protected by, an anonymizing proxy, which allows for learning more about the attacker (e.g., his/her geographic location, toolkits used and the sources of those toolkits, etc.).

In addition to the aforementioned benefits, resources, such as memory resources, may also be conserved by, for example, dynamically creating a targeted set of decoy data and/or decoy resources that is likely to be of interest to the attacker, and storing the targeted decoy data/resources in memory without storing decoy data and/or decoy resources that is unlikely to be of interest to the attacker. That is, the decoy network-based service may be configured to predict future "moves" of the attacker based on one or more initial API calls made by the attacker's computing device, and to create targeted decoy data and/or decoy resources on-the-fly that is tailored to the attacker's predicted movement. Meanwhile, memory resources are conserved by not creating or storing other types of decoy data and/or decoy resources that the attacker is unlikely to target. Customer experience is also improved by the techniques and systems described herein by improving the security of customer data and/or resources, which gives customers of network-based services piece-of-mind that their accounts are unlikely to be compromised.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram showing aspects of the operation of a service provider network 102 that includes a decoy network-based service 100, according to some configurations. A service provider network 102 may represent a computing network (or system) configured to provide computing resources (sometimes referred to herein as "resources") on a permanent or an as-needed basis. Among other types of functionality, the computing resources provided by the service provider network 102 can be utilized to implement various types of network services. The computing resources provided by the service provider network 102 can include, without limitation, data processing resources, data storage resources, virtual machine ("VM") instances, networking resources, data communication resources, network services, and other types of computing resources.

The service provider network 102 can be accessed using an appropriate computing system, such as the computing devices 104(1) and 104(2) (collectively 104) shown in FIG. 1, to communicate with the service provider network 102 over an appropriate data communications network. In this way, customers, such as the customer 106, of the service provider network 102 can configure various aspects of the operation of the computing resources provided by the service provider network 102, or to otherwise control any computing resources being utilized by the customers.

For example, and without limitation, a computing device 104(1) can be utilized by a customer 106 to purchase, and/or otherwise access, computing resources of one or more network-based services, such as the network-based service 108 shown in FIG. 1. The customer 106, using the computing device 104(1), may configure aspects of the operation of these computing resources, may access and utilize functionality and data provided by the various services, tools, environments, and systems described herein, and/or perform other types of functionality with regard to the operation of these and other computing resources provided by the service provider network 102.

The computing devices (e.g., the computing devices 104) utilized to configure and monitor the resources in the service provider network 102 (can be any type of computing device capable of connecting to the service provider network 102 via a suitable data communications network such as, but not limited to, a laptop or desktop computer, a tablet computing device, a server computer, or a smartphone.

Administrative users employed by the owner or operator of the service provider network 102, such as administrators managing the operation of the service provider network 102, can also connect with, manage, and utilize resources provided by network-based services, such as the network-based service 108, executing within the service provider network 102, in a similar fashion. Additional details regarding the configuration and operation of the service provider network 102 will be provided below with regard to FIGS. 7-10.

As discussed briefly above, the service provider network 102 is configured to execute various types of network-based services, both legitimate network-based services (e.g., the network-based service 108) and a decoy network-based service(s) 100. With regard to "legitimate" network-based services, the network-based service 108 shown in FIG. 1 may represent, by way of example and not limitation, a storage service that stores and maintains data on behalf of customers (e.g., the customer 106) of the service provider network 102. Such a storage service may provide and maintain logical storage units in the form of storage containers that are accessible to authorized computing devices (e.g., accessible to the computing device 104(1) of the customer 106), and/or to authorized customers 106, and/or to VM instances provided by an on-demand computing service executing in the service provider network 102, and/or to other authorized computing devices. Storage containers, in this scenario, are examples of "resources" that can be created and managed on behalf of the customers 106 who are authorized to access the network-based service 108.

In some embodiments, a legitimate network-based service, such as the network-based service 108, can control access to its resources and/or data using associated access policies and security credentials. In some configurations, access policies can be, or include, Identity and Access Management (IAM)-based access policies that enable controlled access to resources and/or data of the network-based service 108. In defining an access policy for a resource of the network-based service 108, for example, a customer 106 may create and manage users, groups, roles, tasks, actions, etc., and use permissions and setup security credentials (e.g., usernames, passwords, tokens, etc.) to allow and/or deny those users, groups, and/or roles access to a given resource. Access policies may define access levels, resources, and/or conditions that are allowed or denied for the network-based service 108. In some configurations, access policies can be defined in JavaScript Object Notation (JSON) format. In some configurations, computing devices and/or users may be regarded as sources, while resources, such as storage containers, VM instances, and the like, may be regarded as targets, and the access policies may be defined in terms of which sources are allowed or denied access to which targets using permissions, conditions, and/or other information specified in the access policies.

In an example scenario with reference to FIG. 1, the customer 106 may utilize the computing device 104(1) to send a request 110 to access the network-based service 108 (a legitimate network-based service). The request 110 may include a legitimate security credential (e.g., username, password, token, etc.), and the request 110 may be received by an endpoint 112. The endpoint 112 may be associated with a uniform resource locator (URL) that acts as an entry point for accessing the network-based service 108. If the network-based service 108 supports regions, the endpoint 112 may be associated with a region (e.g., a regional endpoint 112 associated with a geographic area), which may reduce data latency in a customer's 106 application by utilizing an endpoint 112 that is close (in network distance) to the computing device 104(1), as compared to other endpoints 112 in other regions. In any case, the endpoint 112 may receive the request 110, and may authenticate and/or authorize the request 110 based on the legitimate credential included in the request 110. In some cases, additional checks (e.g., checks regarding roles, permissions, etc.) can be made before allowing the computing device 104(1) to access the network-based service 108, such as to download data (e.g., a file) from a storage container to the computing device 104(1).

As shown in FIG. 1, the service provider network 102 may further include a decoy network-based service 100 that is used to deceive attackers, such as the attacker 114, into thinking that they are interacting with a legitimate network-based service, such as the network-based service 108, even though they are not. The decoy network-based service 100 may include a decoy credential component 116. The decoy credential component 116 is configured to publish decoy credentials (e.g., phony usernames, passwords, tokens, etc.) on multiple different Internet-accessible sites (e.g., websites) as a means of luring attackers to access the decoy network-based service 100. The decoy credentials that are published by the decoy credential component 116 may be generated and maintained in a decoy credential store 118 that is accessible to components of the service provider network 102, such as the endpoint 112. In this manner, the endpoint 112 may provide (e.g., grant), or deny, access to a requesting computing device based on the use of the decoy credentials maintained in the decoy credential store 118. The decoy credentials maintained in the decoy credential store 118 may be phony, or fake, credentials that are similar to legitimate security credentials in the sense that an unsuspecting attacker 114 and/or an associated computing device 104(2) is unable detect that a credential is in fact a decoy credential, as opposed to a legitimate credential. For instance, a decoy credential may share the same structure or sequence of characters with a legitimate credential, yet the decoy credential may nevertheless include a particular decoy credential signature, such as an identifier (ID) (e.g., a code, a bit, a tag, a flag, a sub-sequence of characters/digits, etc.) that sets the decoy credentials apart (i.e., distinguishes) from legitimate credentials. In some embodiments, such a decoy credential signature can be included in metadata of the decoy credential, can be encoded, or can otherwise remain "hidden" so as to not be visibly detectable by a human. In some embodiments, decoy credentials may be created in a particular format that is different from the format used for legitimate credentials. The distinctive decoy credential signature of a decoy credential can be used by the endpoint 112 to authorize an incoming request, such as the request 120 received from the computing device 104(2). If the request 120 includes a decoy credential that matches a decoy credential in the decoy credential store 118, the endpoint 112 can grant the computing device 104(2) access to the decoy network-based service 100.

The decoy credential component 116 may be configured to generate new decoy credentials and publish decoy credentials at any suitable time and to any suitable Internet-accessible address/location. For example, decoy credentials may be periodically published to a source code repository (e.g., GitHub) from which attackers have been known to harvest security credentials. Accordingly, in some embodiments, decoy credentials may be published by virtue of embedding the decoy credentials within content (e.g., source code) available on an Internet-accessible site. This technique may be effective for luring attackers because attackers have been known to harvest security credentials from source code repositories when, for example, a customer 106 uploads source code with credentials to a private source code repository and subsequently makes the source code open source (i.e., publicly accessible) on a public source code repository. Thus, an attacker 114 may be fooled into thinking that a decoy credential that is buried (or "planted") within a customer's 106 publicly-available source code is in fact a legitimate credential usable to gain access to sensitive data and/or resources accessible to the customer 106.

In some embodiments, the decoy credential component 116 employs an automated technique to publish new decoy credentials on different Internet-accessible sites at a predefined interval (e.g., periodically) or in response to an event(s) (when an administrator creates and uploads a new decoy credential). In an illustrative example, the decoy credential component 116 may programmatically publish a first set of decoy credentials on different Internet-accessible sites, and, after a predefined period of time since publishing the first set of decoy credentials, the decoy credential component 116 may programmatically publish a second set of decoy credentials to the same set of Internet-accessible sites, or to a different set of Internet-accessible sites. The objective may be to make attackers 114 believe that the decoy credentials are in fact legitimate credentials published on Internet-accessible sites by mistake, and which can be used to gain unauthorized access to data and/or resources of a legitimate network-based service 108, even though they grant access exclusively to a decoy network-based service(s) 100. Accordingly, the decoy credentials may look similar to, and may coexist in similar locations with, legitimate credentials, on any suitable Internet-accessible site.

In some embodiments, the decoy credential component 116 is configured to determine that a credential (i.e., a legitimate credential) of a customer 104 has been compromised, and may "convert" the compromised credential to a decoy credential that may be left in place to lure attackers 114 to the decoy network-based service 100. For example, a customer 104 may have inadvertently provided (e.g., published) his/her credential on a site(s), such as by saving source code in a publicly-accessible source code repository (e.g., GitHub) and accidentally leaving a credential in the source code that can be used to access a legitimate network-based service 108. Accordingly, the decoy credential component 116 may be configured to scan sites (e.g., websites) for the existence of customer credentials, and may flag any credentials that are found as "compromised" credentials due to the fact that they are publicly accessible to a broader audience. Thus, the decoy credential component 116 may be configured to store compromised credentials as a decoy credential (e.g., by storing the compromised credentials as decoy credentials within the decoy credential store 118 so that they are added to a repository of decoy credentials). In some embodiments, the compromised credential is also "disabled" for purposes of accessing a legitimate network-based service(s) 108, and/or the customer 104 is notified that their credential has been compromised, possibly with a suggestion to create a new credential for accessing the legitimate network-based service(s) 108. Any disabling of a credential (including one that has been compromised) may be done in response to receiving the customer's 104 consent to do so.

If a decoy credential is obtained by an attacker 114 (e.g., if the attacker 114 uses a web crawler to scrape the decoy credential from an Internet-accessible site), the attacker 114 may then utilize a toolkit configured to determine the access that the decoy credential provides. For instance, the attacker 114 may use a toolkit that is capable of using credentials to figure out permissions available to a customer's cloud environment and to obtain access keys that provide access to various data and/or resources. In the example of FIG. 1, the attacker 114 uses the computing device 104(2) to send an initial request 120 to the service provider network 102 requesting to access a network-based service. In this example, the request 120 includes a decoy credential that is maintained in the decoy credential store 118. The endpoint 112 may receive the request 120 and determine that the request 120 includes the decoy credential (e.g., by determining that the credential includes an identifier (ID) or a format associated with a decoy credential signature), and the endpoint 112 may grant the computing device 104(2) access to the decoy network-based service 100 accordingly. After granting the computing device 104(2) access to the decoy network-based service 100, traffic (e.g., API calls) is routed to/from the computing device 104(2) through a decoy control plane 122.

It is to be appreciated that the endpoint 112 may represent an endpoint 112 that processes both requests 110 that include legitimate credentials, and requests 120 that include decoy credentials. However, in some embodiments, a separate, decoy endpoint may be used to receive and process requests that are forwarded from another component of the service provider network 102. That is, a component, such as the endpoint 112, upon receiving the request 120 with the decoy credential, may forward the request 120 to a decoy endpoint that mimics a legitimate endpoint 112 (e.g., includes a URL that acts as a service entry point), but that provides access to the decoy network-based service 100. Such a decoy endpoint may not receive any requests 110 that include legitimate credentials, and its primary purpose may be to process requests 120 from attackers 114 that provide decoy credentials.

The decoy control plane 122 may represent a layer of components (e.g., hardware and software) configured to process API calls and manage aspects of the decoy-network-based service 100. As shown in FIG. 1, the decoy control plane 122 may include an API gateway 124 that uses APIs that are the same as the APIs that are used to access data and/or resources of one or more legitimate network-based services, such as the APIs used to access data and/or resources of the network-based service 108. In this way, the computing device 104(2) may interact with the decoy network-based service 100 in the same way that it would interact with the legitimate network-based service 108; namely, by making the same types of API calls it would make to the network-based service 108. This makes it appear to the attacker 114 (and to the associated computing device 104(2)) that the endpoint 112 is interacting with legitimate data and/or resources of a network-based service 108, when, in reality, the endpoint 112 is acting as an entry point to the decoy network-based service 100 by virtue of routing traffic (e.g., API calls made by the computing device 104(2)) through the decoy control plane 122 (e.g., via the API gateway 124) that is dedicated to the decoy network-based service 100. It is to be appreciated that the API gateway 124 is merely an example component(s) that is configured to process API calls made by a computing device, and that other types of components besides an API gateway may be used in the decoy control plane 122 to define a set of APIs and to process API calls in a similar manner to that described herein with respect to the API gateway 124. Accordingly, the API gateway 124, or any similar type of component(s) of the decoy control plane 122, may be configured to process API calls made by any computing device during a given session to allow the computing device to access decoy data 126 and decoy resources 128 that are returned (e.g., instantiated and executed) in a decoy data plane 130. The decoy data plane 130 may represent another layer of components (e.g., hardware and software) configured to instantiate and execute resources and/or data for access by the computing device 104(2) of the attacker 114. The decoy data 126 and decoy resources 128 may be instantiated and executed in the decoy data plane 130 at the direction of a decoy workflow engine 132 that receives API calls made by the computing device 104(2) via the decoy control plane 122. In some embodiments, the API gateway 124 of the decoy control plane 122 may be configured to concurrently process API calls from a plurality of computing devices, such as multiple computing devices of attackers who have obtained decoy credentials previously published by the decoy credential component 116.

The decoy workflow engine 132 may be modeled upon, and hence mimic, the workflow of a legitimate network-based service 108. However, instead of providing the attacker's 114 computing device 104(2) with access to actual data and resources of the service provider network 102, the decoy workflow engine 132 is configured to access decoy data 126 and decoy resources 128 from a decoy data/resource store 134, and to respond to API calls made by the computing device 104(2) by returning the decoy data 126 and/or decoy resources 128 to the computing device 104(2) via the decoy data plane 130 (e.g., by instantiating and executing decoy resources 128 in the decoy data plane 130).

The decoy data/resource store 134 may represent a persistence layer that includes any suitable type and amount of decoy data 126 and any suitable type and amount of decoy resources 128. The decoy data 126 and/or decoy resources 128 are available to be returned to the computing device 104(2) via the decoy data plane 130. By way of example, and not limitation, the decoy data/resource store 134 can include decoy data processing resources, decoy data storage resources, decoy virtual machine ("VM") instances, decoy networking resources, decoy data communication resources, decoy network services, decoy functions, decoy applications (e.g., web applications), and other types of decoy computing resources 128. The decoy data/resource store 134 can also include, without limitation, additional decoy credentials, decoy account information, decoy roles, permissions associated with the decoy roles, decoy regions that are indicated as an unused region(s), a decoy port identifier, or any other type of decoy data 126.

Figure 2:
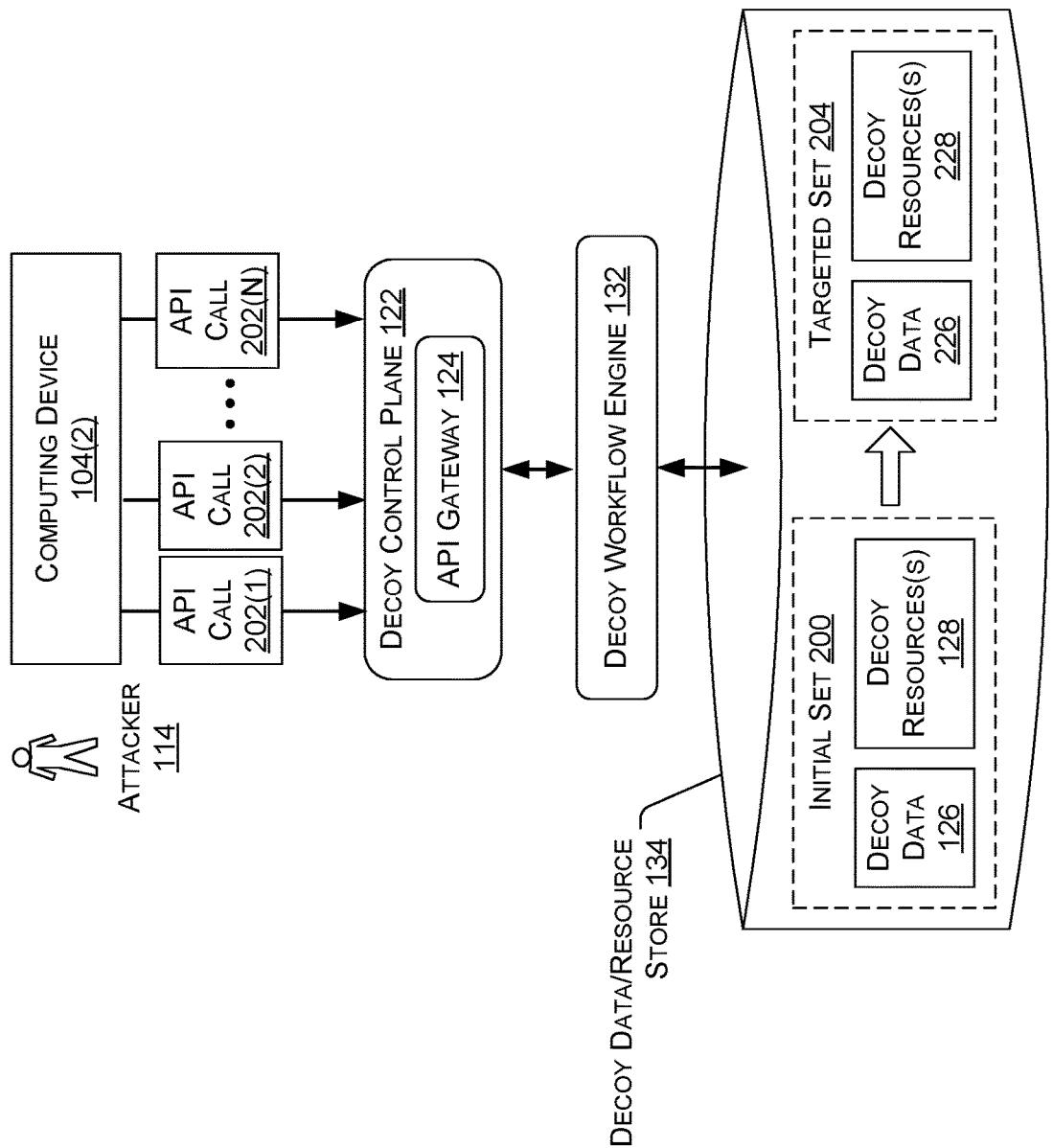
FIG. 2 is a schematic diagram illustrating example techniques for routing API calls through a decoy control plane and dynamically creating targeted decoy data and/or decoy resources based on the API calls received via the decoy control plane.

To conserve memory resources, prior to receiving a request 120 from a computing device 104(2) of an attacker 114, the type and amount of decoy data 126 and decoy resources 128 stored in the decoy data/resource store 134 may be limited to an initial set 200 (See FIG. 2) of decoy data 126 and decoy resources 128, which may be sufficient for responding to one or more initial API calls made by the computing device 104(2). For example, and with reference to FIG. 2, the computing device 104(2), after being granted access to the decoy network-based service 100 based on an incoming request 120 with a decoy credential, may make/issue a first API call 202(1) (e.g., a "GetAccountInfo" call), and the decoy workflow engine 132 may respond by returning decoy data 126 and/or a decoy resource 128 from the initial set 200 of decoy data 126 and decoy resources 128 available in the decoy data/resource store 134.

With reference again to FIG. 1, in order to determine which decoy data 126 and/or decoy resource 128 to return in response to an individual API call 202, the decoy workflow engine 132 may utilize a rules engine 136, such as a forward inferencing rules engine. The rules engine 136 may specify a set of API calls 202, and a set of rules that dictate how the decoy workflow engine 132 is to respond to an API call within the set of API calls 202 specified by the rules engine 136. For example, the first API call 202(1) may be provided as input to the rules engine 136, and the decoy workflow engine 132 may determine, based at least in part on the output from the rules engine 136, particular decoy data 126 (e.g., decoy account information, an additional decoy credential, etc.) and/or a particular decoy resource 128 to return to the computing device 104(2) via the decoy data plane 130. Returning the decoy data 126 and/or decoy resource 128 to the computing device 104(2) may lure the attacker 114 into another iteration of his/her attack (i.e., lure the attacker 114 into advancing the attack). The decoy workflow engine 132 may iteratively respond in this manner (e.g., using the rules engine 136 to return decoy data 126 and/or decoy resources 128) to lure the attacker 114 deeper and deeper into his/her attack.

In an illustrative example, the attacker's 114 computing device 104(2) may issue an API call 202, and, in response, the decoy workflow engine 132 may instantiate what looks like a legitimate web application, but is really a decoy web application (i.e., a decoy resource 128). The attacker 114 may utilize a toolkit to execute reconnaissance against the decoy web application. For example, the attacker 114 may use a tool like Nmap (Network Mapper) to enumerate all of the ports that are open on a particular address, which causes the computing device 104(2) to make one or more corresponding API calls 202 to accomplish this task. The decoy workflow engine 132 may provide the incoming API calls 202 as input to the rules engine 136, and, based at least in part on output from the rules engine 136, may return decoy port identifiers (e.g., decoy data 126), which the attacker 114 might use to try to implement a brute force attack. For instance, the attacker 114 might use brute forcing tool, such as THC-Hydra, Crowbar, or the like, to send hundreds of requests (via additional API calls 202) with different decoy credentials they have harvested, hoping that one of them will gain access to valuable data and/or resources. The decoy workflow engine 132 may return decoy data 126 and/or decoy resources 128 in response to these incoming API calls 202 based on output from the rules engine 136 for purpose of luring the attacker 114 deeper into his/her attack so that the activity can be recorded/monitored.

FIG. 1 also illustrates that the decoy workflow engine 132 may include a targeting component 138. The targeting component 138 is configured to "get ahead" of the attacker 114 by building out decoy data and decoy resources that are tailored to what the attacker 114 is targeting. The targeting component 138 may not bother building out other areas that are not targeted by the attacker 114, thereby conserving memory resources. With brief reference again to FIG. 2, the targeting component 138 is configured to build out a targeted set 204 of decoy data 226 and decoy resources 228 in response to API calls 202 made by a computing device 104(2) of an attacker 114 and received by the decoy workflow engine 132 via the decoy control plane 122. For instance, the decoy workflow engine 132 may receive a first API call 202(1) via the decoy control plane 122, and may use the targeting component 138 to determine, based on the first API call 202(1), at least one of a type of data or a type of resource that the computing device 104(2) is likely to target using a future API call 202. The targeting component 138 may then create decoy data 226 that is of the type of data, and/or one or more decoy resources 228 that are of the type of resource, and may store the decoy data 226 and/or decoy resource(s) 228 in memory (e.g., in the decoy data/resource store 134) for access in the future. Subsequently, upon receiving a second API call 202(2) via the decoy control plane 122, the decoy workflow engine 132 may respond by returning the decoy data 226 and/or the decoy resource(s) 228 (from the targeted set 204) to the computing device 104(2) via the decoy data plane 130. The determination of the type of data and the type of resources to "build out" in the targeted set 204 of decoy data 226 and decoy resources 228 may be based on historical data (e.g., past API calls 202, past sequences (e.g., signal patterns) of API calls 202, etc.) that are usable (e.g., using analytics built around known sequences/patterns of API calls) to make predictions as to future API calls 202 that the attacker 114 is likely to make. In some embodiments, machine learning models may be used for such prediction capabilities of the targeting component 138.

In an illustrative example, a first API call 202(1) may be a "GetAccountInfo" call. The targeting component 138 may determine, based on receiving the first API call 202(1), that the attacker's next move may be to target a particular type of data (e.g., roles of an access policy). Accordingly, the targeting component 138 can create decoy roles (i.e., decoy data 226) with names like "SuperUser," "Administrator," "PowerUser," "Developer," and the like, and may create permissions that are associated with these decoy roles. In some cases, the targeting component 138 may even create a targeted set 204 of decoy resources 228 that map to the decoy roles (i.e., decoy data 226). After the first API call 202(1), for example, the attacker 114 may use a toolkit to enumerate all of the roles defined in an access policy, which causes the computing device 104(2) to make one or more additional API calls 202 (e.g., a second API call 202(2), such as a "GetRoles" call and/or a "GetRolePermissions" call), and the decoy data 226 and/or the decoy resource(s) 228 from the targeted set 204 can be returned in response to the additional API call(s) 202.

In another illustrative example, the targeting component 138 may determine, based on a first API call 202(1), that the attacker 114 is likely targeting unused regions available to a customer account. In response, the targeting component 138 may create and store a targeted set 204 of decoy data 226 in the form of decoy regions that are indicated as unused regions, and/or decoy resources 228 that are usable in these unused decoy regions. The attacker 114 may then target the decoy regions, causing the computing device 104(2) to make one or more additional API calls 202 for instantiating resources in the unused regions, and the decoy workflow engine 132 may respond by returning a decoy resource 228 to make it appear to the attacker 114 that he/she has gained access to an unused region available to an actual customer account.

Returning with reference to FIG. 1, the decoy network-based service 100 is shown as further including an attack monitoring component 140. The attack monitoring component 140 is configured to obtain (e.g., store, record, monitor, etc.) and analyze data relating to an entity's (e.g., the attacker's 114) activity while interacting with the decoy data 126/226 and/or the decoy resources 128/228 returned via the decoy data plane 130. In this sense, the decoy data 126/226 and the decoy resources 128/228 executed in the decoy data plane 130 act as a "honeypot" of sorts to gather data relating to the activity (e.g., interactions) of monitored entity (e.g., the attacker 114). The attack monitoring component 140 may store the data it collects in an activity data store 142. In various examples, the data stored by the attack monitoring component 140 may relate to the API calls 202 made by the computing device 104(2) of the attacker 114 through the course of interacting with the decoy network-based service 100, and the stored data may include, without limitation, sequence data indicating a sequence of the API calls 202, toolkit data indicating a toolkit(s) used to make the API calls 202, source data indicating a source(s) of the toolkit(s), and/or geo-location data indicating a geographic location associated with the computing device 104(2). In some examples, the data stored in the activity data store 142 may include data relating to domain name system (DNS) calls that indicate sources of toolkits used by the attacker 114.

The data obtained by the attack monitoring component 140 may be used to determine reconnaissance and/or exploitation techniques used by the entity (e.g., software, human, etc.) associated with the computing device 104(2), as well as a motivation(s) of the entity (e.g., the attacker 114). In this sense, the attack monitoring component 140 may be configured to analyze the data relating to API calls 202 made by the computing device 104(2) in order to determine a motivation of the attacker 114 (e.g., whether the attacker is motivated by data exfiltration, fraud, ransom, spying, etc.). From this determination, further information may be deduced about the attacker 114, such as whether the attacker 114 is likely to be a state sponsored hacker, a member of an organized crime syndicate, an individual operating on a personal computer at a residential address, or the like.

In an illustrative example, the decoy workflow engine 132 may cause a decoy VM instance (e.g., a Linux instance) with an overly-permissive role to be instantiated in the decoy data plane 130, and the attacker 114 may target this decoy VM instance via a sequence of API calls 202 issued by the computing device 104(2) in an effort to obtain access to sensitive data using the decoy VM instance. The attack monitoring component 140, in this example, may be used to record the attacker's 114 exploitation technique by storing data relating to the API calls 202 that are made by the computing device 104(2) while interacting with the decoy VM instance. For example, the attack monitoring component 140 may store sequence data indicating the sequence of the API calls 202 as being one of a first API call 202(1) in the form of a "GETAccountInfo" call, a second API call 202(2) in the form of a "GetRoles" call, a third API call 202(3) in the form of a "GetRolePermissions" call, a fourth API call 202(4) in the form of a "GetKeys" call, and so on and so forth. The attack monitoring component 140 may further analyze this recorded data to determine a motivation of the attacker 114 (e.g., motivations like fraud, spying, ransom, data exfiltration, etc.). Data pertaining to the motivations determined by the attack monitoring component 140 may also be stored in the activity data store 142 in association with the data relating to the API calls 202, and, in some cases, in association with an identifier of the computing device 104(2).

A security component 144 may be configured to take various security-related actions based on the data recorded by the attack monitoring component 140. For instance, the data recorded by the attack monitoring component 140 may be indicative of a pattern of reconnaissance, and may be used for a security-related action such as training a detection model (i.e., a machine learning model(s), such as a classifier(s)) configured to detect unauthorized access to one or more network-based services (e.g., to detect when API calls 202 from a computing device match a signature of an attacker). Over time, the attack monitoring component 140 may collect a large corpus of data relating to API calls 202 made by computing devices of multiple attackers 114, and this data may be labeled with motivations (e.g., fraud, spying, ransom, data exfiltration, etc.) that can be used in a supervised, or semi-supervised learning (e.g., active learning) system to train machine learning models.

Machine learning generally involves processing a set of examples (called "training data") in order to train a machine learning model(s). A machine learning model, once trained, is a learned mechanism that can receive new data as input and estimate or predict a result as output. For example, a trained machine learning model can comprise a classifier that is tasked with classifying unknown input (e.g., an unknown image) as one of multiple class labels (e.g., labeling the image as a cat or a dog). In the context of the present disclosure, the unknown input may include, inter alia, data relating to API calls 202 made by a computing device 104 while interacting with the service provider network 102, and the trained machine learning model(s) may be tasked with classifying the unknown input (a subject for classification) as one of multiple class labels (e.g., attacker, authorized user, etc.). Thus, the security component 144 may be configured to train a single machine learning model, or an ensemble of base-level machine learning models, which may include, without limitation, tree-based models, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. The output of the machine learning model(s), when used to detect security breaches, may be used to notify customers, in real-time, about security breaches pertaining to their data and/or resources.

As another example, the security component 144 may be configured to determine, based at least in part on determined motivations of attacker 114, a current attack trend, and to notifications to customers 106 of the service provider network 102 regarding the current attack trend. For example, the security component 144 can determine that there has been a recent uptick in attacks from sources in a particular geographic area, and the security component 144 can send notifications (e.g., emails, text messages, etc.) to customers 106 alert them to this attack trend. In some embodiments, the security component 144 may be configured to output a security suggestion to a customer(s) 106 of the service provider network 102 based at least in part a determined motivation(s) of an attacker(s) 114 and/or based on an attack trend. Such a security suggestion may provide one or more instructions to improve security of data or resources associated with a customer account (e.g., instructions regarding how to implement security controls to block traffic from ISPs in a particular geographic area, how to use encryption when storing sensitive data, etc.). The security component 144 may be configured to take other types of remedial actions in addition, or as an alternative, to those described above. For example, the security component 144 may route traffic from an attacker 114 to "black hole" routes and/or lock the attacker 114 out from accessing any legitimate data and/or resources of customers of the service provider network 102.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
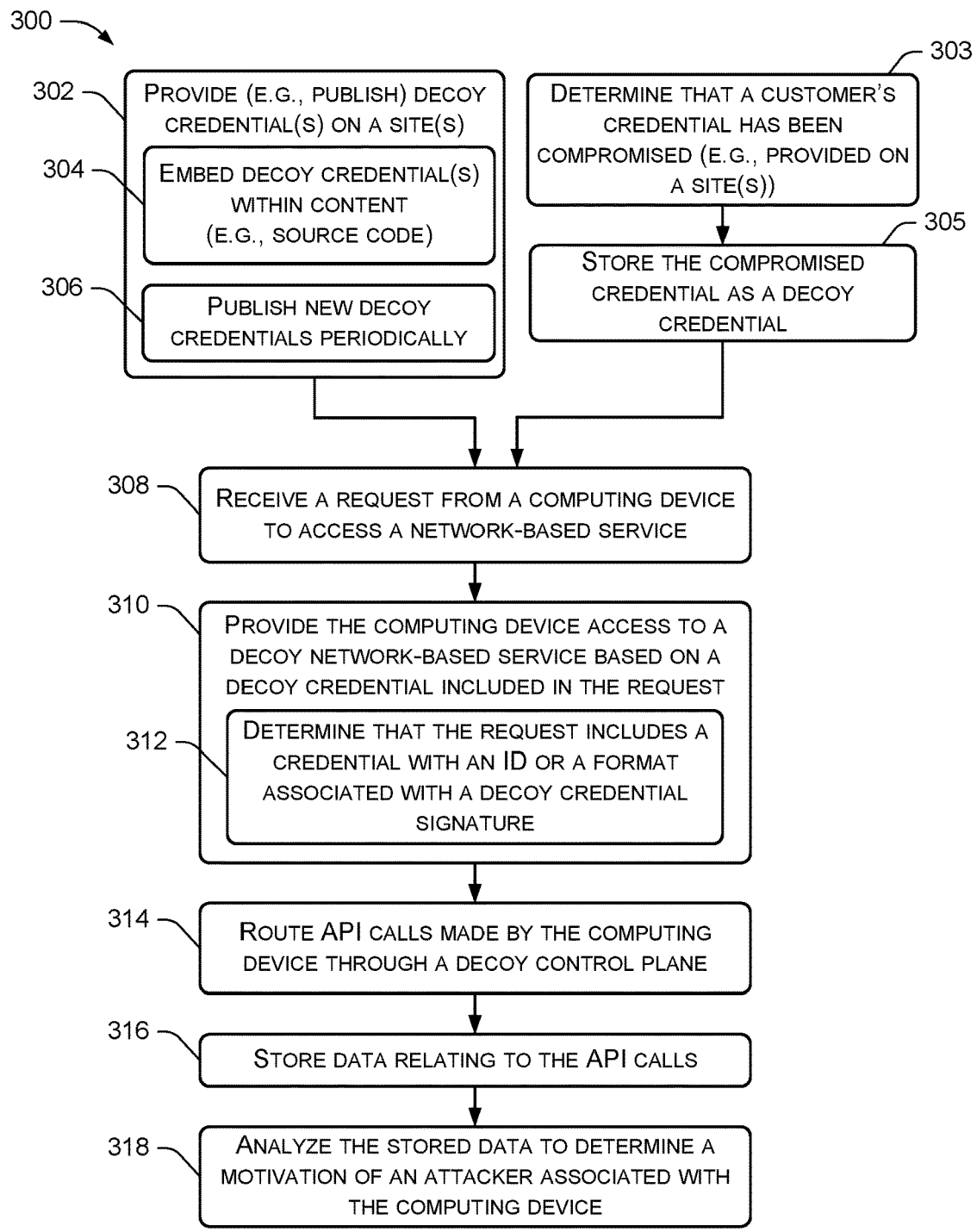
FIG. 3 is a flow diagram showing aspects of a process for luring an attacker to access a decoy network-based service using a decoy credential(s), storing data relating to API calls made by a computing device of the attacker, and analyzing the data to determine a motivation of the attacker.

FIG. 3 is a flow diagram showing aspects of a process 300 for luring an attacker 114 to access a decoy network-based service 100 using a decoy credential(s), storing data relating to API calls 202 made by a computing device 104(2) of the attacker 114, and analyzing the data to determine a motivation of the attacker 114. The process 300 is described, by way of example, with reference to the previous figures.

At 302, the decoy credential component 116 of the decoy network-based service 100 may provide (e.g., publish) a decoy credential(s) on a site(s) (e.g., an Internet-accessible site, such as a website(s)). For example, the decoy credential component 116 may publish a plurality of decoy credentials on multiple different Internet-accessible sites (e.g., websites). As shown by sub-blocks 304 and 306, the publishing at block 302 may include various sub-operations.

At 304, for example, the publishing of a decoy credential may include embedding the decoy credential within content available on the Internet-accessible site. For instance, a decoy credential may be embedded within source code that is publicly available in a source code repository having a URL accessible to computing devices on the Internet.

At 306, for example, the publishing of a decoy credential may include publishing new decoy credentials periodically. For example, the decoy credential component 116 may publish a plurality of first decoy credentials on a plurality of different Internet-accessible sites, and may subsequently publishing a plurality of second/additional decoy credentials on the plurality of different Internet-accessible sites (or a different set of Internet-accessible sites) after a predefined period of time since the publishing of the plurality of first decoy credentials.

At 303, in addition, or as an alternative, to the providing of the decoy credential(s) on the site(s) at block 302, the decoy credential component 116 may determine that a credential (i.e., a legitimate credential) of a customer has been compromised. For example, a customer 104 may have inadvertently provided (e.g., published) his/her credential on a site(s), such as by saving source code in a publicly-accessible source code repository (e.g., GitHub) and accidentally leaving a credential in the source code that can be used to access a legitimate network-based service 108. Accordingly, the decoy credential component 116 may, at block 303, scan sites (e.g., websites) for the existence of customer credentials, and may flag any credentials that are found as "compromised" credentials due to the fact that they are publicly accessible to a broader audience.

At 305, the decoy credential component 116 may store the compromised credential as a decoy credential (e.g., within the decoy credential store 118 so that it is added to a repository of decoy credentials). In some embodiments, the compromised credential is also "disabled" for purposes of accessing a legitimate network-based service(s) 108, and/or the customer 104 is notified that their credential has been compromised, possibly with a suggestion to create a new credential for accessing the legitimate network-based service(s) 108. Any disabling of a credential (including one that has been compromised) may be done in response to receiving the customer's 104 consent to do so.

At 308, the service provider network 102 may receive, over a wide area computer network, a request 120 from a computing device 104(2) to access a network-based service. The request 120 received at block 308 may include a security credential.

At 310, the computing device 104(2) may be provided (e.g., granted) access to a decoy network-based service 100 based at least in part on receiving a decoy credential in the request 120. For example, the endpoint 112 of the service provider network 102 may grant the computing device 104(2) access to the decoy network-based service 100 at block 310 based on a decoy credential included in the request 120.

At sub-block 312, the granting the computing device 104(2) access to the decoy network-based service 100 may comprise determining that the request 120 includes a credential with an identifier (ID) or a format associated with a decoy credential signature, indicating that the credential included in the request 120 is a decoy credential previously published at block 302. The ID associated with a decoy credential signature may be a code, a bit, a tag, a flag, a sequence of characters/digits, or any suitable identifier that is indicative of the credential being a decoy credential. In some embodiments, ID can be extracted from metadata of the decoy credential, such as by decoding encoded data associated with the decoy credential at block 312.

At 314, API calls 202 made by the computing device 104(2) may be routed (e.g., by the endpoint 112) through a decoy control plane 122 of the decoy network-based service 100. In this manner, the decoy workflow engine 132 can receive the API calls 202 via the decoy control plane 122 (e.g., via the API gateway 124). As shown by way of example in FIG. 2, the API calls 202 that are routed at block 314 may include any number of API calls 202, such as "N" API calls. In general, the API calls 202 are made in sequence, and as such, the API calls 202 are routed in real-time at block 314 whenever the API calls 202 are made.

At 316, the attack monitoring component 140 of the decoy network-based service 100 may store, in memory (e.g., in the activity data store 142), data relating to the API calls 202. The data stored at block 316 may include, without limitation, sequence data indicating a sequence of the API calls 202 made by the computing device 104(2) over a period of time (e.g., during a session), toolkit data indicating a toolkit used to make the API calls 202, source data indicating a source of the toolkit, or geo-location data indicating a geographic location associated with the computing device 104(2), and so on.

At 318, the attack monitoring component 140 may analyze the data relating to the API calls 202 that was stored at block 316 to determine a motivation of an entity associated with the computing device 104(2), such as the attacker 114, or some other user or automated software program. It is to be appreciated that, in some embodiments, the data relating to the API calls 202 may be analyzed at block 318 without storing the data at block 316. An illustrative example of the analyzing at block 318 includes analyzing sequence data relating to a sequence of the API calls 202 to detect a "signature" (e.g., a particular sequence) indicative of a particular motivation (e.g., fraud, ransom, spying, data exfiltration, etc.). As another example, toolkit data indicating a toolkit used by the attacker 114 may be analyzed to determine a motivation. As yet another example, geo-location data indicating a geographic location of the computing device 104(2) may be analyzed to determine a motivation (e.g., an attacker 114 working out of a particular region known for committing credit card fraud through attacks on customer accounts).

Figure 4:
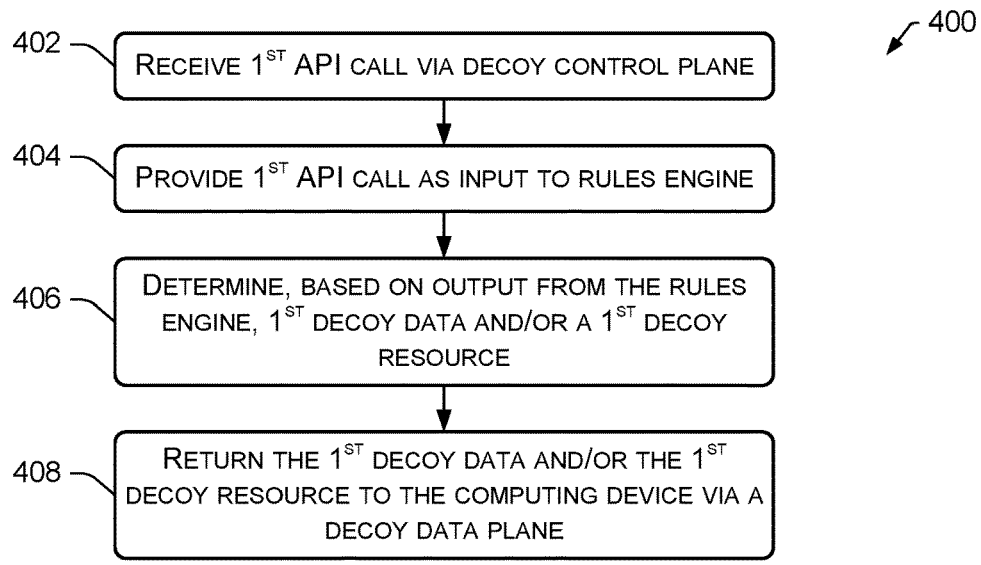
FIG. 4 is a flow diagram showing aspects of a process for using a rules engine to dynamically return decoy data and/or decoy resources in response to API calls made by a computing device of an attacker.

FIG. 4 is a flow diagram showing aspects of a process 400 for using a rules engine 136 to dynamically return decoy data 126/226 and/or decoy resources 128/228 in response to API calls 202 made by a computing device 104(2) of an attacker 114. The process 400 is described, by way of example, with reference to the previous figures.

At 402, the decoy workflow engine 132 of the decoy network-based service 100 may receive a first API call 202(1), of multiple API calls 202 made by a computing device 104(2), that was routed through the decoy control plane 122.

At 404, the decoy workflow engine 132 may provide the first API call 202(1) as input to a rules engine 136. For example, a forward inferencing rules engine 136 may specify a set of API calls 202, and a set of rules that dictate how the decoy workflow engine 132 is to respond to an API call 202 specified by the rules engine 136.

At 406, the decoy workflow engine 132 may determine, based at least in part on output from the rules engine 136, first decoy data 126/226 or a first decoy resource 128/228. For example, the decoy workflow engine 132 may select decoy data 126/226 and/or a decoy resource 128/228 from the available decoy data/resources in the decoy data/resource store 134, the selection based on the output from the rules engine 136.

At 408, the decoy workflow engine 132 may return, to the computing device 104(2) via a decoy data plane 130, the first decoy data 126/226 and/or the first decoy resource 128/228. The decoy data 126/226 and/or decoy resource 128/228 returned at block 408 may mimic data or resources that would be returned by a legitimate network-based service (e.g., the network-based service 108). In various examples, the first decoy data 126/226 returned at block 408 may include, without limitation, an additional decoy credential, a decoy role, a permission associated with the decoy role, decoy regions that are indicated as unused regions, a decoy port identifier, and so on. In various examples, returning the first decoy resource 128/228 at block 408 may include instantiating the first decoy resource 128/228 in the decoy data plane 130 (e.g., instantiating a decoy VM instance).

The process 400 may be used to iteratively return decoy data 126/226 and/or decoy resources 128/228 in an effort to maintain the attacker's 114 interest and to make it seem as though the attacker 114 is accessing real data and/or resources of a legitimate network-based service. In this manner, the decoy workflow engine 132 can react to the attacker's 114 activity and respond in ways that lure the attacker 114 into advancing his/her attack, thereby allowing for additional data about the attacker's 114 activity to be collected and observed by the attack monitoring component 140.

Figure 5:
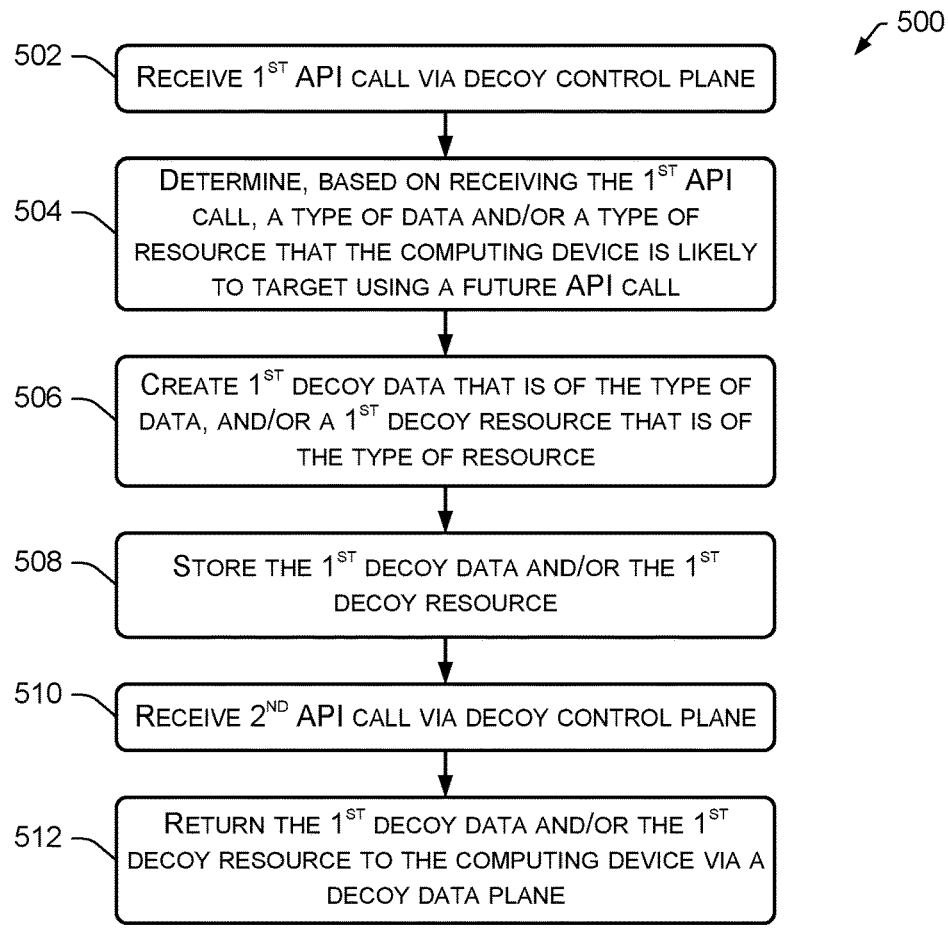
FIG. 5 is a flow diagram showing aspects of a process for dynamically creating targeted decoy data and/or decoy resources based on API calls made by a computing device of an attacker.

FIG. 5 is a flow diagram showing aspects of a process 500 for dynamically creating targeted decoy data 226 and/or decoy resources 228 based on API calls 202 made by a computing device 104(2) of an attacker 114. The process 500 is described, by way of example, with reference to the previous figures.

At 502, the decoy workflow engine 132 of the decoy network-based service 100 may receiving a first API call 202(1), of multiple API calls 202 made by a computing device 104(2), that was routed through the decoy control plane 122.

At 504, the targeting component 138 of the decoy workflow engine 132 may determine, based at least in part on the receiving of the first API call 202(1), at least one of a type of data or a type of resource that the computing device 104(2) is likely to target using a future API call 202. A type of data determined at block 504 may be, for example, data relating to roles for an access policy. A type of resource determined at block 504 may be, for example, a data storage resource (e.g., a storage container).

At 506, the targeting component 138 may create at least one of first decoy data 226 that is of the type of data, or a first decoy resource 228 that is of the type of resource. That is, the targeting component 138 may create decoy data 226 and/or a decoy resource 228 that is targeted to the attacker 114 (e.g., a targeted set 204) of decoy data 226 and/or decoy resources 228. Thus, if the determination at block 504 was that the attacker 114 is likely to target data relating to roles of an access policy, the first decoy data 226 created at block 506 may be a decoy role for a decoy access policy associated with a decoy resource 228. If the determination at block 504 was that the attacker 114 is likely to target data storage resources (e.g., storage containers), the first decoy resource 228 created at block 506 may be a decoy data storage resource (e.g., a decoy storage container).

At 508, the targeting component 138 may store, in memory (e.g., in the decoy data/resource store 134), at least one of the first decoy data 226 or the first decoy resource 228. This is shown, by way of example, in FIG. 2 as the targeted set 204 of decoy data 226 and decoy resources 228.

At 510, the decoy workflow engine 132 may receive, after the receiving of the first API call 202(1) at block 502, a second API call 202(2), of the multiple API calls 202 made by the computing device 104(2), that was routed through the decoy control plane 122.

At 512, the decoy workflow engine 132 may return, to the computing device 104(2) via the decoy data plane 130, the first decoy data 226 and/or the first decoy resource 228. The decoy data 226 and/or decoy resource 228 returned at block 512 may mimic data or resources that would be returned by a legitimate network-based service (e.g., the network-based service 108). In various examples, the first decoy data 226 returned at block 512 may include, without limitation, an additional decoy credential, a decoy role, a permission associated with the decoy role, decoy regions that are indicated as unused regions, a decoy port identifier, and so on. In various examples, returning the first decoy resource 228 at block 512 may include instantiating the first decoy resource 228 in the decoy data plane 130 (e.g., instantiating a decoy VM instance, storage container, etc.).

The process 500 may be used "get ahead" of the attacker's 114 by inferring what the attacker 114 is likely to target, and by building out a targeted set 204 of decoy data 226 and/or decoy resources 228 in advance of returning the targeted decoy data/resources. This can conserve memory resources by exclusively storing the decoy data/resources the attacker 114 is likely to target.

Figure 6:
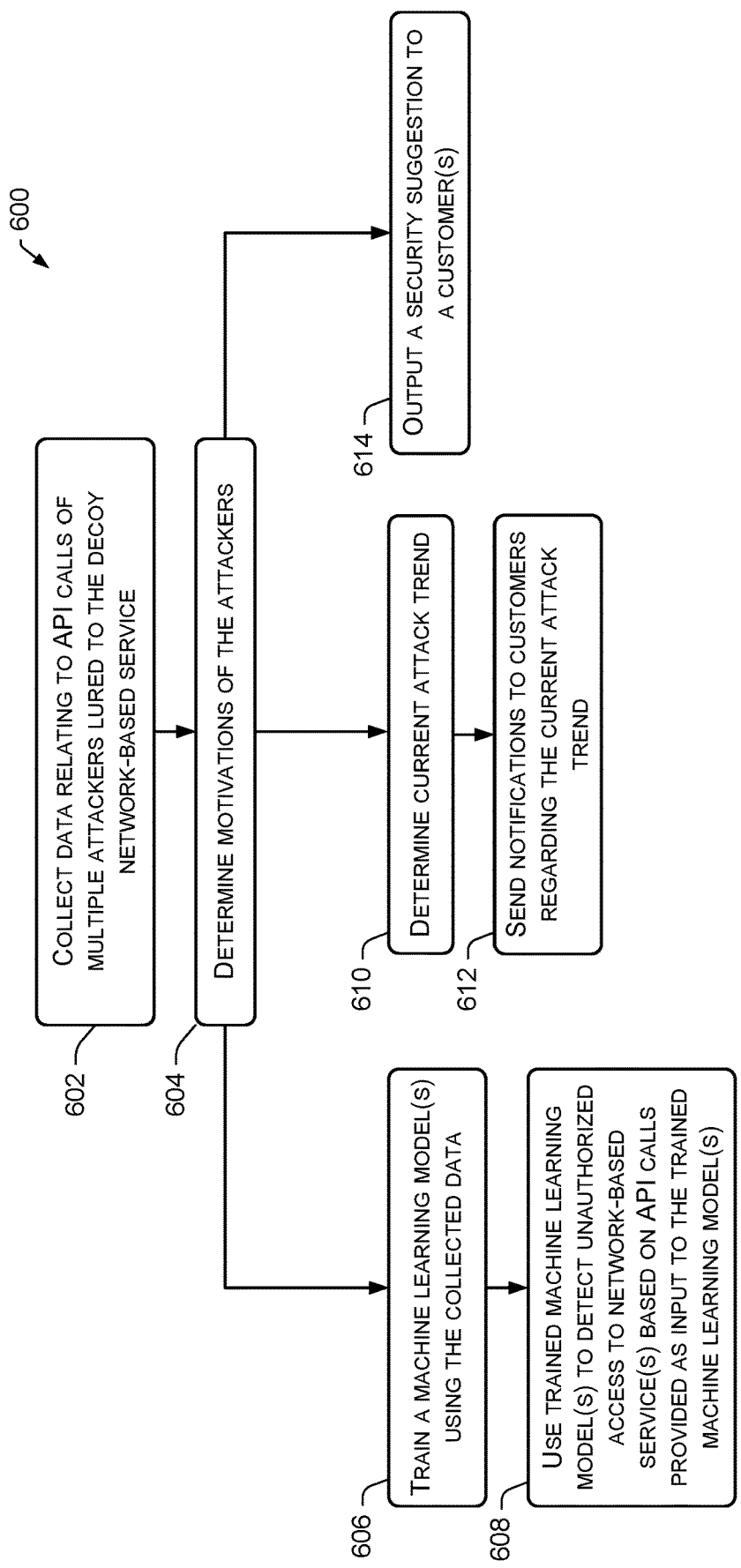
FIG. 6 is a flow diagram showing aspects of a process for taking various security-related actions based on motivations of attackers determined using the techniques and systems described herein.

FIG. 6 is a flow diagram showing aspects of a process 600 for taking various security-related actions based on motivations of attackers determined using the techniques and systems described herein. The process 600 is described, by way of example, with reference to the previous figures.

At 602, the attack monitoring component 140 may collect data relating to API calls 202 of multiple attackers 114 who have been lured to the decoy network-based service 100. For example, the process 300 may be carried out with respect to multiple different attackers 114 to collect data relating to the respective sets of API calls 202 made by the computing devices 104 of those attackers 104 during their respective sessions with the service provider network 102.

At 604, motivations of the multiple attackers 114 may be determined. For example, as described above at least with respect to block 318 of FIG. 3, the attack monitoring component 140 may analyze the data relating to the API calls 202 that was collected at block 602 to determine motivations of the attackers 114. For example, sequence data relating to a sequence of the API calls 202 may be analyzed to detect "signatures" (e.g., particular sequences) indicative of particular motivations (e.g., fraud, ransom, spying, data exfiltration, etc.). As another example, toolkit data indicating toolkits used by the attackers 114 may be analyzed to determine a motivation. As yet another example, geo-location data indicating geographic locations of the computing devices 104 that made the API calls 202 may be analyzed to determine the motivations at block 604.

At 606, the security component 144 of the decoy network-based service 100 may train a machine learning model(s) (e.g., a threat detection model) using the data relating to the API calls 202, and possibly using the motivations determined at block 604 as labels for a supervised learning approach, to generate a trained machine learning model(s).

At 608, the trained machine learning model(s) may be used to detect unauthorized access to one or more network-based services, such as the network-based service 108. For example, a computing device 104 that was granted access to a legitimate network-based service 108 may issue a sequence of API calls 202, and those API calls 202 may be provided as input to the trained machine learning model(s) at block 604 to generate output that indicates a probability of the computing device 104 being associated with an attacker 114 who has gained unauthorized access to the network-based service 108. This type of security-related feature can help detect and prevent unauthorized access to the service provider network 102, and, hence, the sensitive data and resources of its customers.

At 610, as an additional, or alternative, path of the process 600, the security component 144 may determine, based at least in part on the motivations determined at block 604, a current attack trend. For example, the security component 144 can determine that there has been a recent uptick in attacks from sources in a particular geographic area, and/or a recent uptick in attacks that target a particular type of data or a particular type of resource.

At 612, the security component 144 may send notifications to customers 106 of a network-based service 108 regarding the current attack trend. These notifications can be sent in any suitable manner using any suitable type of messaging technology (e.g., email, text, output on a dashboard of a console for accessing the service provider network 102, etc.).

At 614, as an additional, or alternative, path of the process 600, the security component 144 may output a security suggestion to a customer 106 of the network-based service 108 based at least in part on one or more of the motivations determined at block 604. Such a security suggestion may provide one or more instructions to improve security of data or resources associated with a customer account of the customer 106. For instance, a security suggestion output at block 614 may instruct the customer 106 to implement security controls to block traffic from ISPs in a particular geographic area, to use encryption when storing sensitive data, and how to implement these security features.

Figure 7:
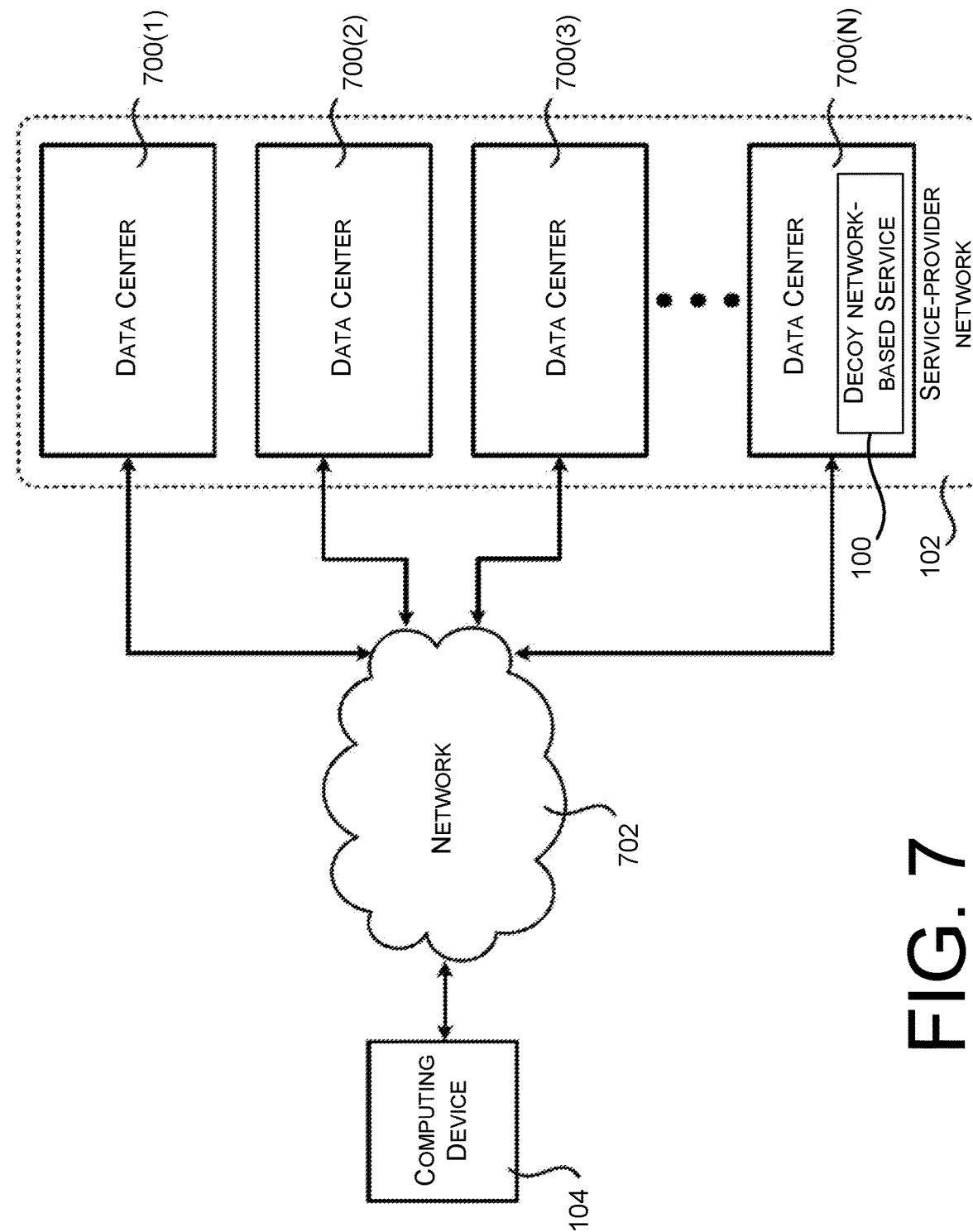
FIG. 7 is a system and network diagram that shows an illustrative operating environment that includes a service provider network that can be configured to implement aspects of the functionality described herein.

FIG. 7 is a system and network diagram that shows one illustrative operating environment for the configurations disclosed herein that includes a service provider network 102 that can be configured to execute decoy network-based service 100, and the other network-based services described herein, according to one particular configuration. As discussed briefly above, the service provider network 102 can execute network services that provide computing resources on a permanent or an as-needed basis. Among other types of functionality, the computing resources provided by the service provider network 102 can be utilized to implement the various network services described herein. As also discussed above, the computing resources provided by the service provider network 102 can be, without limitation, data storage resources, data processing resources, such as VM instances, networking resources, data communication resources, network services, and other types of resources, including both real and decoy resources.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. These concepts apply to decoy resources as well. The service provider network 102 can also be configured to provide other types of computing resources not mentioned specifically herein.

The computing resources provided by the service provider network 102 are enabled in one implementation by one or more data centers 700(1)-(N) (collectively 700). The data centers 700 are facilities utilized to house and operate computer systems and associated components. The data centers 700 typically include redundant and backup power, communications, cooling, and security systems. The data centers 70 can also be located in geographically disparate locations. One illustrative configuration for a data center 700 that can be utilized to implement the technologies disclosed herein will be described below with regard to FIG. 8. For example, the data center 700(N) is shown as implementing the decoy network-based service 100 described herein.

The customers 106 of the service provider network 102 can access the computing resources provided by the service provider network 102 over a network 702, which can be a wide area communication network ("WAN"), such as the Internet, an intranet or an Internet service provider ("ISP") network or a combination of such networks. For example, and without limitation, a computing device 104 operated by a customer 106 of the service provider network 102 can be utilized to access the service provider network 102 by way of the network 702. It should be appreciated that a local-area network ("LAN"), the Internet, or any other networking topology known in the art that connects the data centers 700 to remote customers and other users can be utilized. It should also be appreciated that combinations of such networks can also be utilized. Attackers 114 that use decoy credentials may access the service provider network 102 in the same manner as authorized customers 106. The access requests from attackers 114, however, are routed to the decoy network-based service 100 via the decoy control plane 122, as described herein.

Figure 8:
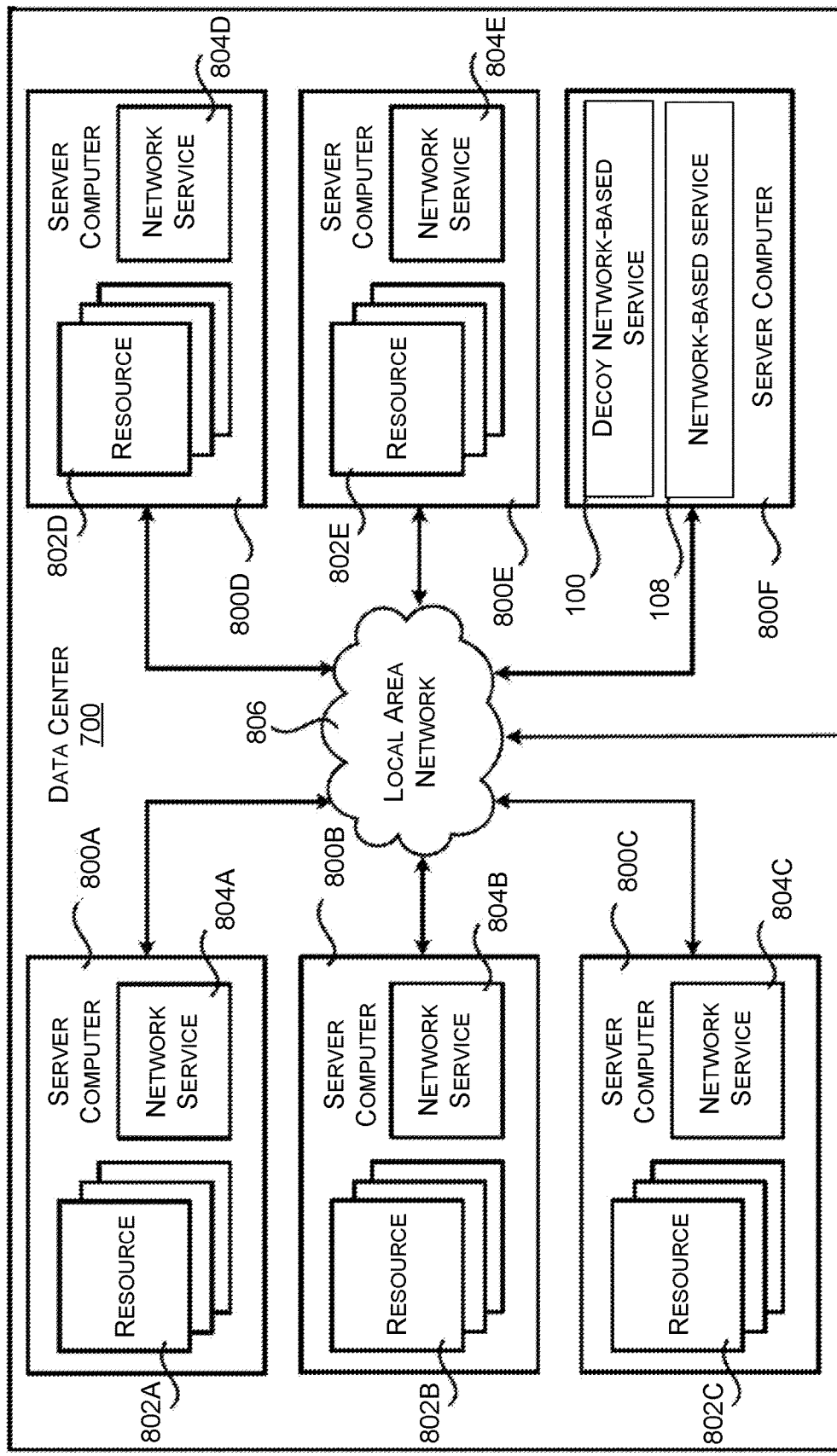
FIG. 8 is a computing system diagram illustrating a configuration for a data center that can be utilized to implement aspects of the technologies disclosed herein.

FIG. 8 is a computing system diagram that illustrates one configuration for a data center 700 that can be utilized to implement the decoy network-based service 100, and the other network services disclosed herein. The example data center 700 shown in FIG. 8 includes several server computers 800A-800E (collectively 800) for providing the computing resources 802A-802E, respectively.

The server computers 800 can be standard tower, rack-mount, or blade server computers configured appropriately for providing the various computing resources described herein (illustrated in FIG. 8 as the computing resources 802A-802E). As mentioned above, the computing resources 802 provided by the service provider network 102 can be data storage resources (e.g., storage containers 108, data objects 110, etc.), data processing resources such as VM instances or hardware computing systems, database resources, networking resources, and others. A subset of these resources 802 may be decoy resources with access to decoy data, as enabled by the decoy network-based service 100, as described herein. Some of the servers 800 can also be configured to execute network services 804A-804E capable of instantiating, providing and/or managing the computing resources 802, some of which are described in detail herein, and which includes the decoy network-based service 100.

The data center 700 shown in FIG. 8 also includes a server computer 800F that can execute some or all of the software components described above. For example, and without limitation, the server computer 800F can be configured to execute the decoy network-based service 100 described in detail above. The server computer 800F can also be configured to execute other components and/or to store data (including decoy data 126/226) for providing some or all of the functionality described herein. In this regard, it should be appreciated that components or different instances of the decoy network-based service 100 can execute on many other physical or virtual servers in the data centers 700 in various configurations.

In the example data center 700 shown in FIG. 8, an appropriate LAN 806 is also utilized to interconnect the server computers 800A-800F. The LAN 806 is also connected to the network 702 illustrated in FIG. 7. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 700(1)-(N), between each of the server computers 800A-800F in each data center 700, and, potentially, between computing resources 802 in each of the data centers 700. It should be appreciated that the configuration of the data center 700 described with reference to FIG. 8 is merely illustrative and that other implementations can be utilized.

Figure 9:
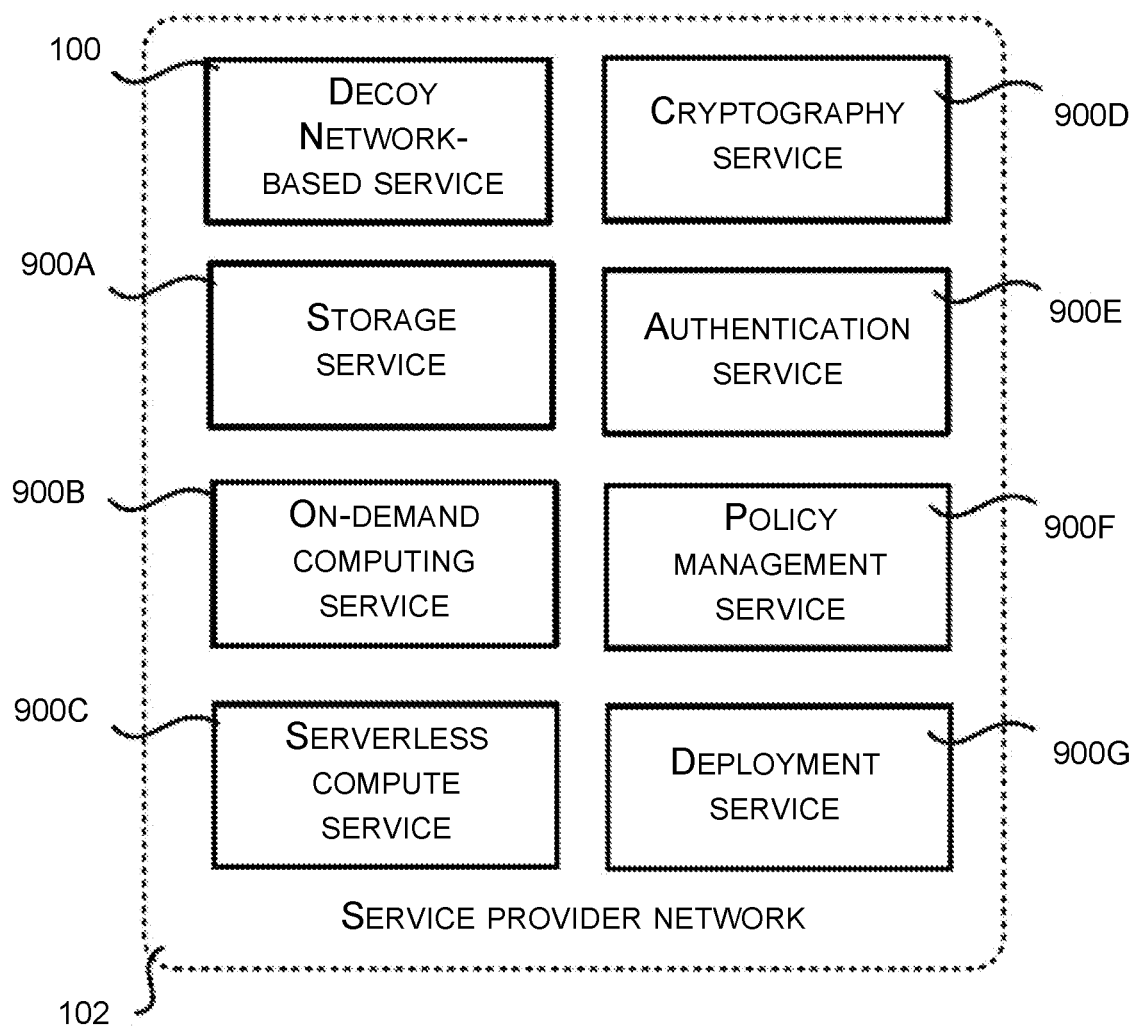
FIG. 9 is a network services diagram that shows aspects of several services that can be provided by and utilized within a service provider network configured to implement the various technologies disclosed herein.

FIG. 9 is a system and network diagram that shows aspects of several network services that can be provided by and utilized within a service provider network 102 in one configuration disclosed herein. In particular, and as discussed above, the service provider network 102 can provide the decoy network-based service 100 that is implemented to deceive attackers 114 by mimicking other legitimate network-based services, including, but not limited to, a storage service 900A, an on-demand computing service 900B, a serverless compute service 900C, a cryptography service 900D, an authentication service 900E, a policy management service 900F, and/or a deployment service 900G. The service provider network 102 can also provide other types of network services.

It is to be appreciated that users of the service provider network 102 can include organizations or individuals that utilize some or all of the network services provided by the service provider network 102. As described above, customers 106 and attackers 114 alike can communicate with the service provider network 102 using an appropriate computing device 104 through a network, such as the network 702 shown in FIG. 7.

It is also noted that not all configurations described include the network services shown in FIG. 9 and that additional network services can be provided in addition to, or as an alternative to, the services explicitly described herein. Each of the services shown in FIG. 9, including the decoy network-based service 100, can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other, perhaps with the exception of the decoy network-based service 100, which may execute in an isolated network apart from the legitimate network-based services 900A-900G. Additional details regarding some of the services shown in FIG. 9 will now be provided.

The storage service 900A may store and maintain data on behalf of customers the service provider network 102. Such a storage service 900A may provide and maintain logical storage units in the form of storage containers that are accessible to authorized computing devices, and/or to authorized customers, and/or to VM instances provided by an on-demand computing service executing in the service provider network 102, and/or to other authorized computing devices.

The on-demand computing service 900B can be a collection of computing resources configured to instantiate VM instances and to provide other types of computing resources 802 on demand. For example, a customer of the service provider network 102 can interact with the on-demand computing service 900B (via appropriately configured and authenticated API calls, for example) to provision and operate VM instances that are instantiated on physical computing devices hosted and operated by the service provider network 102. The VM instances can be used for various purposes, such as to operate as servers supporting the network services described herein, a web site, to operate business applications or, generally, to serve as computing resources for the customer.

Other applications for the VM instances can be to support database applications, electronic commerce applications, business applications and/or other applications. Although the on-demand computing service 900B is shown in FIG. 9, any other computer system or computer system service can be utilized in the service provider network 102 to implement the functionality disclosed herein, such as a computer system or computer system service that does not employ virtualization and instead provisions computing resources on dedicated or shared computers/servers and/or other physical devices.

The serverless compute service 900C is a network service that allows customers to execute code (which might be referred to herein as a "function") without provisioning or managing server computers in the service provider network 102. Rather, the serverless compute service 900C can automatically run code in response to the occurrence of events. The code that is executed can be stored by the storage service 900A or in another network accessible location.

In this regard, it is to be appreciated that the term "serverless compute service" as used herein is not intended to infer that servers are not utilized to execute the program code, but rather that the serverless compute service 900C enables code to be executed without requiring a user to provision or manage server computers. The serverless compute service 900C executes program code only when needed, and only utilizes the resources necessary to execute the code. In some configurations, the user or entity requesting execution of the code might be charged only for the amount of time required for each execution of their program code.

The service provider network 102 can also include a cryptography service 900D. The cryptography service 900D can utilize storage services of the service provider network 102, such as the storage service 900A, to store encryption keys in encrypted form, whereby the keys can be usable to decrypt user keys accessible only to particular devices of the cryptography service 900D. The cryptography service 900D can also provide other types of functionality not specifically mentioned herein.

As illustrated in FIG. 9 and discussed above, the service provider network 102, in various configurations, also includes an authentication service 900E and a policy management service 900E. The authentication service 900E, in one example, is a computer system (i.e., collection of computing resources 802) configured to perform operations involved in authentication of customers or users. For instance, one of the services shown in FIG. 9 can provide information from a customer of the authentication service 900E to receive information in return that indicates whether or not the requests submitted by the customer are authentic. In some embodiments, the authentication service 900E may be utilized to "authenticate" attackers 114 when they provide decoy credentials, much in the same way that legitimate customers 106 are authorized based on legitimate credentials.

The policy management service 900F, in one example, is a network service configured to manage policies (e.g., access policies) on behalf of customers of the service provider network 102. The policy management service 900F can include an interface (e.g. API or GUI) that enables customers to submit requests related to the management of a policy, such as a security policy or an access policy. Such requests can, for instance, be requests to add, delete, change or otherwise modify a policy for a customer, service, or system, or for other administrative actions, such as providing an inventory of existing policies and the like.

The service provider network 102 can additionally maintain other network services based, at least in part, on the needs of its customers. For instance, the service provider network 102 can maintain a deployment service 900G for deploying program code in some configurations. The deployment service 900G provides functionality for deploying program code, such as to virtual or physical hosts provided by the on-demand computing service 900B. Other services include, but are not limited to, database services, object-level archival data storage services, and services that manage, monitor, interact with, or support other services. The service provider network 102 can also be configured with other network services not specifically mentioned herein in other configurations. It is to be appreciated that the decoy network-based service 100 may be configured to mimic any individual one, or combination, of the services 900A-900G to deceive attackers into thinking that the decoy network-based service 100 is a legitimate network-based service.

Figure 10:
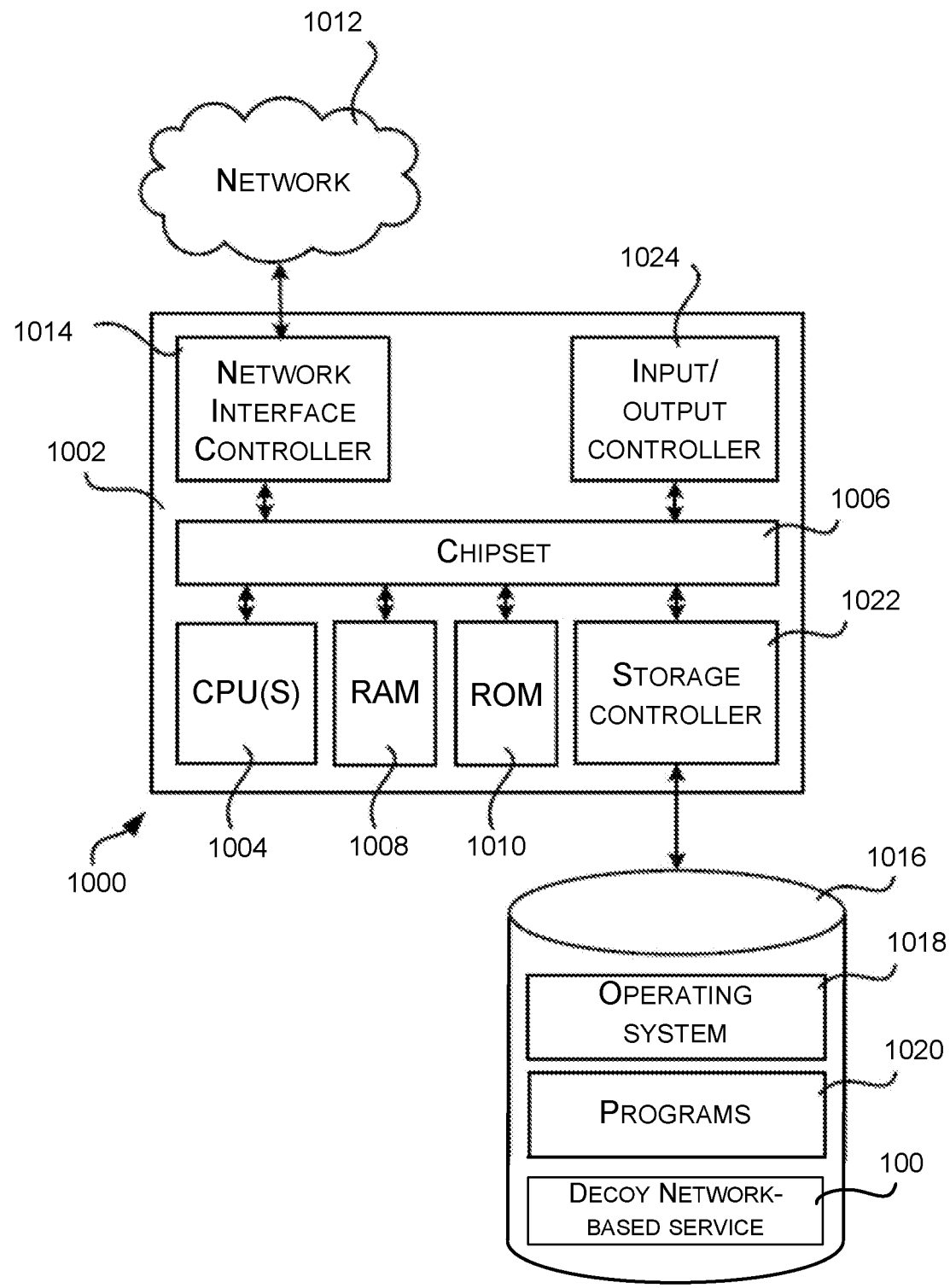
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 1012. The chipset 1006 can include functionality for providing network connectivity through a NIC 1014, such as a gigabit Ethernet adapter. The NIC 1014 is capable of connecting the computer 1000 to other computing devices over the network 1012. It should be appreciated that multiple NICs 1014 can be present in the computer 1000, connecting the computer to other types of networks and remote computer systems.

The computer 1000 can be connected to a mass storage device 1016 that provides non-volatile storage for the computer. The mass storage device 1016 can store an operating system 1018, programs 1020, one or more components of the decoy network-based service 100, and data, which have been described in greater detail herein. The mass storage device 1016 can be connected to the computer 1000 through a storage controller 1022 connected to the chipset 1006. The mass storage device 1016 can consist of one or more physical storage units. The storage controller 1022 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1016 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1016 is characterized as primary or secondary storage, and the like.

For example, the computer 1000 can store information to the mass storage device 1016 by issuing instructions through the storage controller 1022 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1016 by detecting the physical states or characteristics of one or more particular locations within the physical storage units.

In addition to the mass storage device 1016 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1016 can store an operating system 1018 utilized to control the operation of the computer 1000. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1016 can store other system or application programs and data utilized by the computer 1000.

In one configuration, the mass storage device 1016 or other computer-readable storage media is encoded with computer-executable instructions which, when loaded into the computer 1000, transform the computer from a general-purpose computing system into a special-purpose computer capable of implementing the configurations described herein. These computer-executable instructions transform the computer 1000 by specifying how the CPUs 1004 transition between states, as described above. According to one configuration, the computer 1000 has access to computer-readable storage media storing computer-executable instructions which, when executed by the computer 1000, perform the various processes described above. The computer 1000 can also include computer-readable storage media storing executable instructions for performing any of the other computer-implemented operations described herein.

The computer 1000 can also include one or more input/output controllers 1024 for receiving and processing input from a number of input devices, such as a keyboard, a mouse, a touchpad, a touch screen, an electronic stylus, or other type of input device. Similarly, an input/output controller 1024 can provide output to a display, such as a computer monitor, a flat-panel display, a digital projector, a printer, or other type of output device. It is to be appreciated that the computer 1000 might not include all of the components shown in FIG. 10, can include other components that are not explicitly shown in FIG. 10, or can utilize an architecture completely different than that shown in FIG. 10.

Based on the foregoing, it should be appreciated that technologies for providing a network service capable of automatically evaluating and adjusting data security have been disclosed herein. Moreover, although the subject matter presented herein has been described in language specific to computer structural features, methodological acts, and computer readable media, it is to be understood that the appended claims are not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the following claims.

What is claimed is:

1. A system to provide attackers access to a decoy network-based service, the system comprising:
    one or more hardware processors; and
    memory storing computer-executable instructions which, when executed by the one or more hardware processors, cause the system to:
    embed a plurality of decoy credentials within content available on multiple different publicly-accessible source code repositories;
    receive, from a computing device, a request to access a network-based service, the request including a credential;
    determine that the credential included in the request is a decoy credential of the plurality of decoy credentials based at least in part on a decoy credential signature included in metadata of the credential;
    provide, to the computing device, access to the decoy network-based service based at least in part on determining that the credential included in the request is the decoy credential;
    route application programming interface (API) calls made by the computing device through a decoy control plane;
    return, to the computing device via a decoy data plane, decoy data or decoy resources that mimic data or resources that would be returned by the network-based service;
        store sequence data relating to a sequence of the API calls made by the computing device; and
        analyze the sequence data to determine a motivation of an attacker associated with the computing device, the motivation including at least one of data exfiltration, fraud, spying, or ransom.

2. The system of claim 1, wherein the computer-executable instructions, when executed by the one or more hardware processors, further cause the system to:
    receive a first API call, of the API calls, that was routed through the decoy control plane;
    determine, based at least in part on receiving the first API call, at least one of a type of data or a type of resource that the computing device is likely to target using a future API call;
    create at least one of the decoy data that is of the type of data, or the decoy resources that are of the type of resource;
    store, in the memory, at least one of the decoy data or the decoy resources; and
    receive, after the receiving of the first API call, a second API call, of the API calls, that was routed through the decoy control plane,
    wherein the decoy data or the decoy resources are returned at least partly in response to receiving the second API call.

3. The system of claim 1, wherein the computer-executable instructions, when executed by the one or more hardware processors, further cause the system to:
    store additional data relating to the API calls, the additional data including at least one of toolkit data indicating a toolkit used to make the API calls, source data indicating a source of the toolkit, or geo-location data indicating a geographic location associated with the computing device; and
    analyzing the additional data to determine the motivation of the attacker.

4. A computer-implemented method to provide attackers access to a decoy network-based service, the method comprising:
    embedding a plurality of decoy credentials within content available on multiple different publicly-accessible source code repositories;
    receiving, by a system that provides a network-based service, a request from a computing device, the request including a credential;
    determining that the credential included in the request is a decoy credential of the plurality of decoy credentials based at least in part on a decoy credential signature included in metadata of the credential;
    providing, to the computing device, access to the decoy network-based service based at least in part on the determining that the credential included in the request is the decoy credential;
    routing one or more application programming interface (API) calls made by the computing device through a decoy control plane;

storing sequence data associated with a sequence of the one or more API calls made by the computing device; and analyzing the sequence data to determine a motivation of an entity associated with the computing device.

5. The computer-implemented method of claim 4, further comprising:
   receiving a first API call, of the one or more API calls, that was routed through the decoy control plane;
   providing the first API call as input to a rules engine;
   determining, based at least in part on output from the rules engine, first decoy data or a first decoy resource; and
   returning, to the computing device via a decoy data plane, the first decoy data or the first decoy resource.

6. The computer-implemented method of claim 5, wherein the returning comprises returning the first decoy data, and wherein the first decoy data includes at least one of an additional decoy credential, a decoy role, a permission associated with the decoy role, decoy regions that are indicated as unused regions, or a decoy port identifier.

7. The computer-implemented method of claim 4, further comprising:
   receiving a first API call, of the one or more API calls, that was routed through the decoy control plane;
   determining, based at least in part on the receiving of the first API call, at least one of a type of data or a type of resource that the computing device is likely to target using a future API call;
   creating at least one of first decoy data that is of the type of data, or a first decoy resource that is of the type of resource;
   storing, in memory, at least one of the first decoy data or the first decoy resource;
   receiving, after the receiving of the first API call, a second API call, of the one or more API calls, that was routed through the decoy control plane; and
   returning, to the computing device via a decoy data plane, the first decoy data or the first decoy resource.

8. The computer-implemented method of claim 4, further comprising:
   storing additional data relating to the one or more API calls, wherein the additional data comprises at least one of toolkit data indicating a toolkit used to make the one or more API calls, source data indicating a source of the toolkit, or geo-location data indicating a geographic location associated with the computing device; and
   analyzing the additional data to determine the motivation of the entity.

9. The computer-implemented method of claim 4, further comprising, prior to the embedding of the plurality of decoy credentials:
   determining that a compromised credential of a customer has been compromised; and
   storing the compromised credential as the decoy credential.

10. The computer-implemented method of claim 4, wherein the one or more API calls comprise a plurality of API calls, the method further comprising training a machine learning model using the sequence data associated with the sequence of the plurality of API calls to generate a trained machine learning model that is configured to detect unauthorized access to one or more network-based services.

11. The computer-implemented method of claim 4, further comprising:
    determining, based at least in part on the motivation of the entity, a current attack trend; and
    sending one or more notifications to customers of the network-based service regarding the current attack trend.

12. A system for providing access to a decoy network-based service, the system comprising:
    one or more hardware processors; and
    memory storing computer-executable instructions which, when executed by the one or more hardware processors, cause the system to:
    embed a plurality of decoy credentials within content available on multiple different publicly-accessible source code repositories;
    receive a request from a computing device to access a network-based service, the request including a credential;
    determine that the credential included in the request is a decoy credential of the plurality of decoy credentials based at least in part on a decoy credential signature included in metadata of the credential;
    provide, to the computing device, access to the decoy network-based service based at least in part on determining that the credential included in the request is the decoy credential;
    receive, via a decoy control plane, one or more application programming interface (API) calls made by the computing device;
    store sequence data associated with a sequence of the one or more API calls made by the computing device; and
    analyze the sequence data to determine a motivation of an entity associated with the computing device.

13. The system of claim 12, wherein the computer-executable instructions, when executed by the one or more hardware processors, further cause the system to:
    receive, via the decoy control plane, a first API call of the one or more API calls;
    determine, based at least in part on receiving the first API call, at least one of a type of data or a type of resource that the computing device is likely to target using a future API call;
    create at least one of first decoy data that is of the type of data, or a first decoy resource that is of the type of resource;
    store, in memory, at least one of the first decoy data or the first decoy resource;
    receive, via the decoy control plane after the receiving of the first API call, a second API call of the one or more API calls; and
    return, to the computing device via a decoy data plane, the first decoy data or the first decoy resource.

14. The system of claim 12, wherein the computer-executable instructions, when executed by the one or more hardware processors, further cause the system to:
    receive, via the decoy control plane, a first API call of the one or more API calls;
    provide the first API call as input to a rules engine;
    determine, based at least in part on output from the rules engine, first decoy data or a first decoy resource; and
    return, to the computing device via a decoy data plane, the first decoy data or the first decoy resource.

15. The system of claim 12, wherein the computer-executable instructions, when executed by the one or more hardware processors, further cause the system to:
    store additional data relating to the one or more API calls, wherein the additional data comprises at least one of toolkit data indicating a toolkit used to make the one or more API calls, source data indicating a source of the toolkit, or geo-location data indicating a geographic location associated with the computing device; and analyze the additional data to determine the motivation of the entity.

16. The system of claim 12, wherein the one or more API calls comprise a plurality of API calls, and wherein the computer-executable instructions, when executed by the one or more hardware processors, further cause the system to train a machine learning model using the sequence data associated with the sequence of the plurality of API calls to generate a trained machine learning model that is configured to detect unauthorized access to one or more network-based services.

17. The system of claim 12, wherein the computer-executable instructions, when executed by the one or more hardware processors, further cause the system to output a security suggestion to a customer of the network-based service based at least in part on the motivation of the entity, the security suggestion providing one or more instructions to improve security of data or resources associated with a customer account of the customer.

18. The system of claim 12, wherein the content available on the website comprises publicly-available source code.

* * * * *